(12) United States Patent
Bykovnikov

(10) Patent No.: US 7,844,289 B2
(45) Date of Patent: Nov. 30, 2010

(54) METHOD AND APPARATUS FOR SYNCHRONIZATION OF BASE STATIONS IN A BROADBAND WIRELESS ACCESS SYSTEM

(75) Inventor: Vladimir Bykovnikov, Novgorod (RU)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 10/594,547

(22) PCT Filed: Mar. 6, 2006

(86) PCT No.: PCT/RU2006/000101

§ 371 (c)(1),
(2), (4) Date: Sep. 28, 2006

(87) PCT Pub. No.: WO2007/102749

PCT Pub. Date: Sep. 13, 2007

(65) Prior Publication Data

US 2008/0240072 A1    Oct. 2, 2008

(51) Int. Cl.
*H04B 15/00* (2006.01)
(52) U.S. Cl. .................. 455/502; 455/507; 370/350
(58) Field of Classification Search .......... 455/502, 455/507; 370/350; 375/272
See application file for complete search history.

(56) References Cited

U.S. PATENT DOCUMENTS

| | | | | |
|---|---|---|---|---|
| 5,519,759 | A * | 5/1996 | Heineck et al. | 455/422.1 |
| 5,784,368 | A * | 7/1998 | Weigand et al. | 370/350 |
| 5,822,361 | A | 10/1998 | Nakamura et al. | |
| 6,477,385 | B1 * | 11/2002 | Hara | 455/502 |
| 6,621,813 | B2 * | 9/2003 | Petch et al. | 370/350 |
| 2001/0014083 | A1 * | 8/2001 | Pulkkinen et al. | 370/280 |
| 2003/0147362 | A1 * | 8/2003 | Dick et al. | 370/324 |

FOREIGN PATENT DOCUMENTS

GB       2293526       3/1996

OTHER PUBLICATIONS

Invitation to pay additional fees and partial search report, (Feb. 16, 2007), 1-8.

* cited by examiner

*Primary Examiner*—Nick Corsaro
*Assistant Examiner*—Chuong A Ngo
(74) *Attorney, Agent, or Firm*—Thorpe North & Western LLP

(57) ABSTRACT

Synchronization between base stations in a broadband wireless access system is achieved using interfering base stations. Interfering base stations are first identified for a base station of interest (BSOI). One of the interfering base stations is then selected to be a master base station for the BSOI. The BSOI may then establish and maintain synchronization with the master base station.

19 Claims, 9 Drawing Sheets

METHOD AND APPARATUS FOR SYNCHRONIZATION OF BASE STATIONS IN A BROADBAND WIRELESS ACCESS SYSTEM

CROSS REFERENCE TO RELATE APPLICATIONS

This application claims benefit under USC 120 or 365(c) to PCT/RU2006/000101.

TECHNICAL FIELD

The invention relates generally to wireless communications and, more particularly, to broadband wireless networking.

BACKGROUND OF THE INVENTION

Broadband wireless access (BWA) systems are currently in development that will provide high speed wireless network services over relatively large regions. One such technology is embodied in the IEEE 802.16 wireless networking standard (IEEE Std 802.16-2004). Typically, such systems will utilize a number of distributed base stations to provide access services for users over an extended area. Each base station will provide services for subscriber stations within a corresponding coverage area or cell. Time division duplexing (TDD) is currently a preferred technique for managing communication between a base station and a subscriber station within a cell of a BWA system. That is, the base station and the subscriber station will transmit signals to one another using the same frequency, but the base station will transmit at a different time than the subscriber station. TDD has certain advantages over frequency division duplexing (FDD), where the base station transmits at a different frequency from the subscriber station.

One communication technique that has become a popular choice for use in broadband systems is orthogonal frequency division multiplexing (OFDM)/orthogonal frequency division multiple access (OFDMA). OFDM uses a plurality of relatively narrowband subcarriers to transmit data through a channel. Each subcarrier may be separately modulated with a corresponding data symbol within the transmitter. An "OFDM symbol" is then transmitted that includes all of the subcarriers and their corresponding symbols. OFDMA is a technique that may be used to provide multiple access in an OFDM system. In OFDMA, different subgroups of subcarriers within an OFDM symbol may be allocated to different users in the system. It has been shown that maximum spectral efficiency may be achieved in an OFDMA system when each of the cells in the system utilize the same frequency (i.e., frequency reuse 1). When TDD is being used in such a scenario, interference between base stations may occur if one base station is transmitting while another base station is receiving. Thus, if a portion of an uplink subframe in one cell occurs at the same time as a portion of a downlink subframe in an adjacent cell (and vice versa), then communication within both cells may be compromised. To prevent this from occurring, the base stations within a network may be synchronized so that uplink and downlink operations do not overlap.

It has been proposed that GPS receiver technology be provided within each of the base stations within a BWA system for use in providing synchronization between the base stations (see, e.g., IEEE Std 802.16-2004). While GPS receivers are capable of providing accurate synchronization, there are situations where their use may be limited. If it is desired to locate a base station within a building, for example, the GPS receiver may not be able to acquire an adequate number of satellite signals to generate accurate time information for use in synchronization. In addition, the inclusion of a GPS receiver in a base station may add significant cost to the base station. In some BWA system implementations, for example, the cell size may be relatively small (e.g., 0.3-1 km), thus requiring a large number of pico-base stations to cover a given area. If base stations are expensive, the cost of implementing such a system may be prohibitive. If base stations are available that do not include GPS receivers, then system implementation costs may be reduced significantly. For each of the above reasons, it may be desirable to develop alternative techniques for synchronizing the base stations of a BWA system.

DETAILED DESCRIPTION

Figure 1:
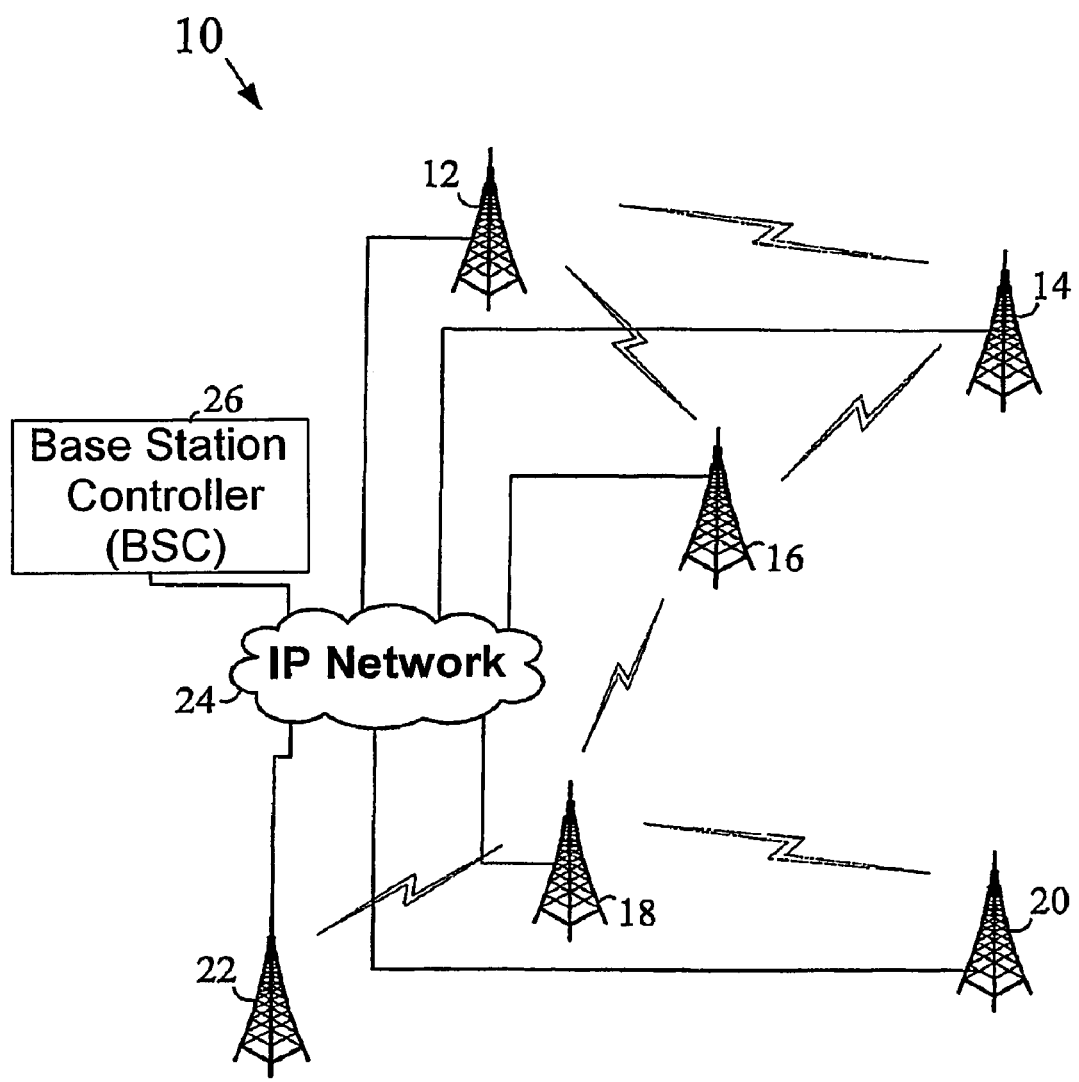
FIG. 1 is a diagram illustrating an example broadband wireless access (BWA) system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example broadband wireless access (BWA) system 10 in accordance with an embodiment of the present invention. As illustrated, the BWA system 10 may include: a plurality of base stations 12, 14, 16, 18, 20, 22; an IP network 24 interconnecting the base stations 12, 14, 16, 18, 20, 22; and a base station controller (BSC) 26. The base stations 12, 14, 16, 18, 20, 22 are each operative for providing wireless access services for subscriber stations (not shown) within a corresponding coverage region or cell. The IP network 24 allows the base stations 12, 14, 16, 18, 20, 22 to communicate with one another, with the BSC 26, and possibly with one or more other networks and/or entities (e.g., the Internet, a public switched telephone network (PSTN), etc.). The IP network 24 may be a wired network, a wireless network, or a hybrid wired/wireless network. The BSC 26 controls at least some of the operational features of the base stations of the BWA system 10. The BSC 26 may be implemented within a separate control server within the system 10, within one of the base stations, or in some other network location. The base stations 12, 14, 16, 18, 20, 22 may, in various embodiments, communicate with the BSC 26 using wired, wireless, or hybrid wired/wireless links.

In at least one implementation, the base stations 12, 14, 16, 18, 20, 22 utilize OFDMA techniques to communicate with subscriber stations in corresponding cells. Transmissions from a base station to a subscriber station are referred to as downlink transmissions and transmissions from a subscriber station to a base station are referred to as uplink transmissions. In some embodiments, wireless communication within a cell is performed in consecutive frames. Each frame may be divided into a downlink subframe during which the base station transmits to the subscriber stations and an uplink subframe during which the subscriber stations transmit to the base station. Because the downlink subframe and the uplink subframe occur at different times, this is an example of TDD operation.

Figure 2:
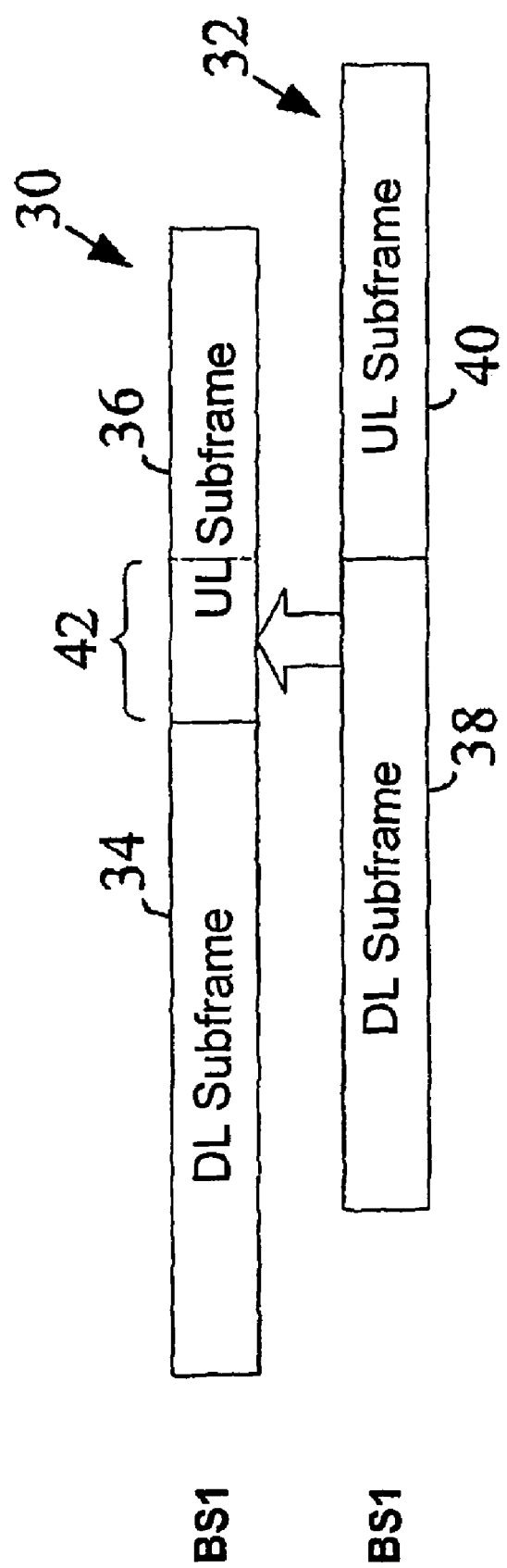
FIG. 2 is a timing diagram illustrating interference between base stations in an OFDMA-based TDD BWA network environment.

In one operational scenario, the base stations 12, 14, 16, 18, 20, 22 within the BWA network 10 may each be operated in the same frequency channel. This raises the possibility that wireless transmissions within one cell may cause interference within another nearby cell, thereby reducing communication quality within the other cell. For example, if a first base station within a first cell is transmitting while a second base station within a neighboring second cell is receiving, the transmitted signal from the first base station may make it difficult or impossible for the second base station to accurately receive signals transmitted to it by subscribers within the second cell. FIG. 2 is a timing diagram illustrating such an occurrence in an OFDMA-based wireless network environment. As shown, a cell associated with a first base station (BS1) utilizes a first frame 30 to communicate with corresponding subscriber stations and a cell associated with a second, neighboring base station (BS2) utilizes a second frame 32 to communicate with its subscriber stations. Although not shown, such frames will repeat over time within each cell. The first frame 30 includes a downlink subframe 34 and an uplink subframe 36. As described previously, during the downlink subframe 34, BS1 transmits to the subscriber stations in the corresponding cell and during the uplink subframe 36 the subscriber stations transmit to BS1. The wireless receiver within BS1 is activated during the uplink subframe 36 to receive the transmissions of the subscriber stations in the cell.

The second frame 32 also includes a downlink subframe 38 and an uplink subframe 40. As shown in FIG. 2, there is an overlap 42 between the downlink subframe 38 associated with BS2 and the uplink subframe 36 associated with BS1. Therefore, a portion of the downlink subframe 38 may be received by the wireless receiver of BS1 while it is also receiving signals from the subscriber stations. This portion of the downlink subframe 38 will therefore act as noise/interference in BS1 which may compromise the accurate reception of the subscriber signals. To overcome this situation, the first and second base stations may be synchronized so that the downlink subframes 34, 38 and the uplink subframes 36, 40 align with one another in time. The present invention relates to methods and structures for achieving base station synchronization in a BWA system.

Figure 3:
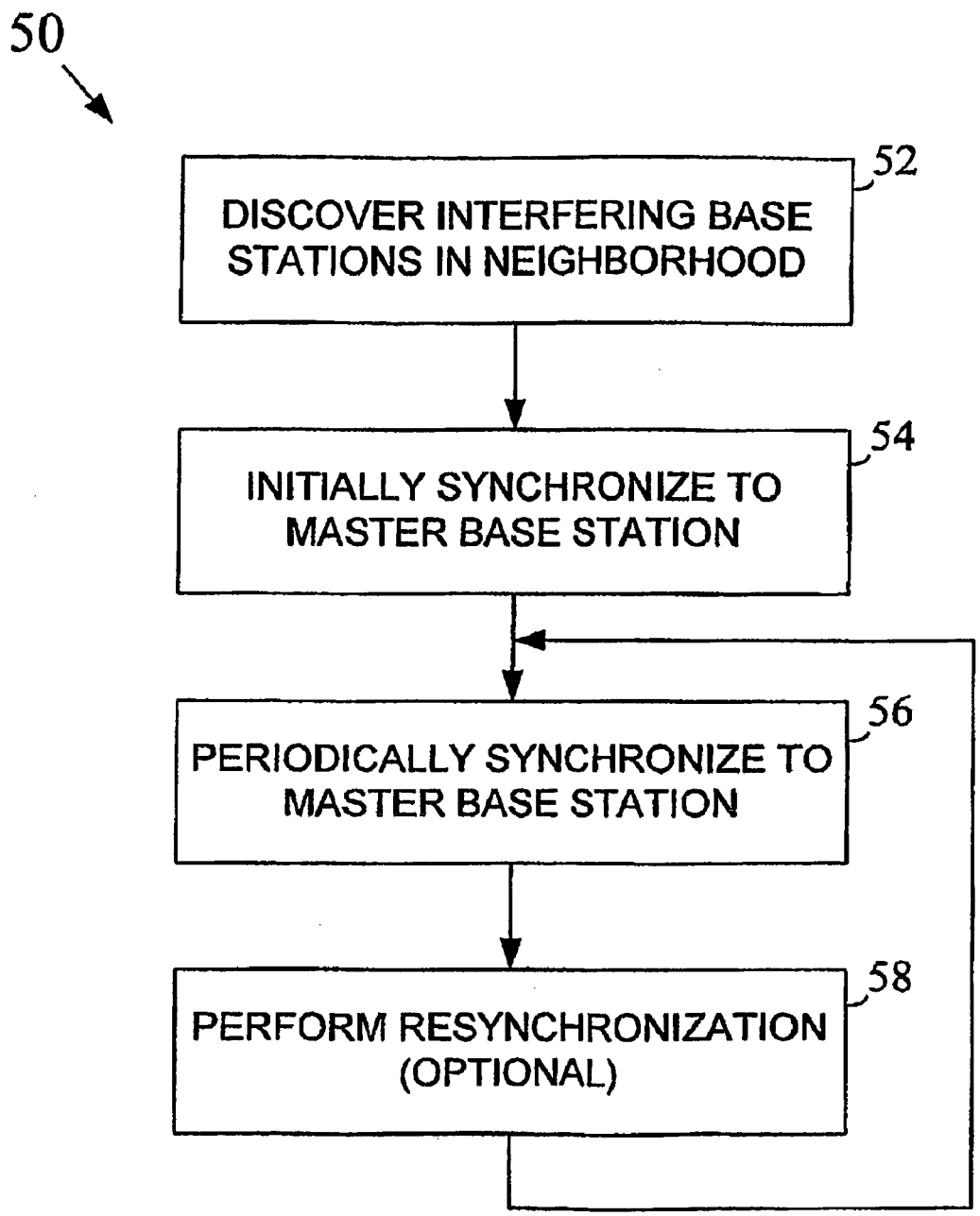
FIG. 3 is a flowchart illustrating an example procedure for initiating and maintaining synchronization between a base station of interest (BSOI) and other base stations in a system in accordance with an embodiment of the present invention.

In one aspect of the present invention, the downlink transmissions of interfering base stations are used to provide synchronization for a base station of interest (BSOI) in a BWA system. FIG. 3 is a flowchart illustrating an example procedure 50 for initiating and maintaining synchronization between a base station of interest (BSOI) and other base stations in a system in accordance with an embodiment of the present invention. The procedure 50 is divided into various phases that are followed by the BSOI. In a first phase, known as the discovery phase 52, the BSOI discovers interfering base stations in a surrounding environment. As used herein, an "interfering base station" is a base station whose transmissions are detectable by a BSOI or satisfy some predetermined interference related criterion (e.g., exceed a predetermined interference receive strength within the BSOI and received signal strength of base station is enough to perform accurate initial and periodic synchronization, etc.). Information is collected for the interfering base stations for use in selecting a master base station for the BSOI. Once a master base station has been selected, an initial synchronization phase 54 may be entered during which the BSOI synchronizes to the master base station. The BSOI may operate in a subscriber station emulation mode during both the discovery phase 52 and the initial synchronization phase 54.

After initial synchronization, the BSOI may periodically enter a synchronization maintenance mode 56 during which the BSOI will refresh or correct its synchronization with the selected master base station. This may be done using, for example, a ranging code transmitted by the master base station at an appropriate time. Every now and then, a "resynchronization mode" 58 may be entered during which the selected master base station and/or other synchronization parameters may be modified for the BSOI. Using the inventive techniques, a situation may arise where there are multiple "sync groups" in a BWA system. A sync group is a group of base stations that are synchronized to one another. Resynchronization may be required for a BSOI when a new base station enters the BWA system that discovers interfering base stations within multiple different sync groups. If the BSOI is in one of these different sync groups, it may need to have a new master base station assigned.

Figure 4:
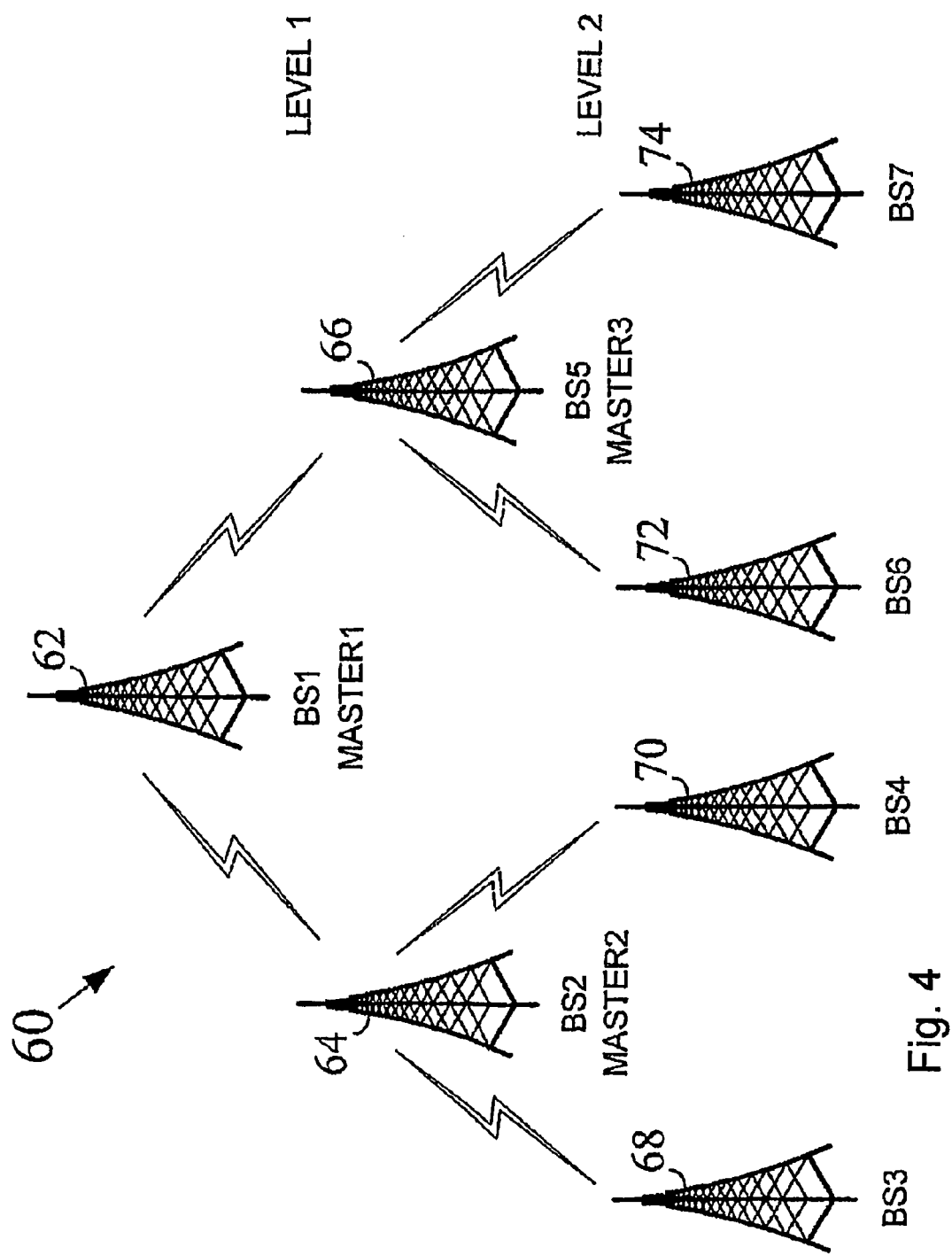
FIG. 4 is a diagram illustrating an example base station synchronization hierarchy that may exist within a BWA system in accordance with an embodiment of the present invention.

The inventive synchronization scheme will often lead to a situation where multiple master/slave "levels" are established in a BWA system. FIG. 4 is a diagram illustrating an example base station synchronization hierarchy 60 that may exist within a BWA system in accordance with an embodiment of the present invention. As shown, in a first synchronization level (LEVEL1) of the hierarchy 60, a first base station 62 acts as a master base station to slave base stations 64 and 66. In a second level (LEVEL2), base station 64 acts as a master base station to slave base stations 68 and 70 and base station 66 acts as a master base station to slave base stations 72 and 74. Any number of different levels may be present. The synchronization hierarchy 60 may represent only one sync group within a BWA system. That is, one or more additional sync groups may also be present. As used herein, the phrase "primary master base station" will be used to denote the master base station at the highest level of the synchronization hierarchy in a sync group.

Figure 5:
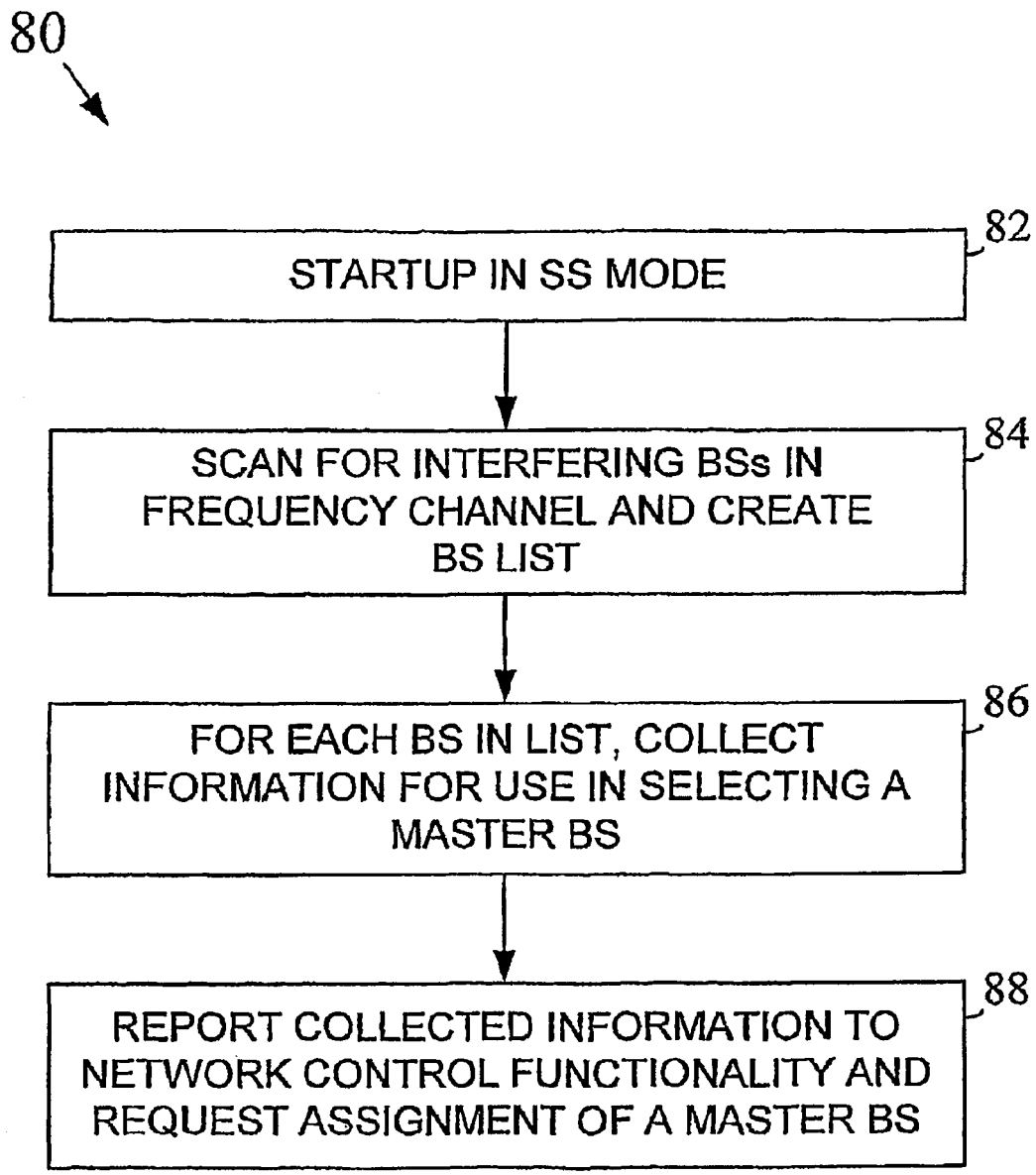
FIG. 5 is a flowchart illustrating an example method that may be used by a BSOT during a synchronization discovery phase in accordance with an embodiment of the present invention.

FIG. 5 is a flowchart illustrating an example method 80 that may be used by a BSOI during a synchronization discovery phase in accordance with an embodiment of the present invention. It is assumed that the BSOI is to be activated in a region where a BWA system, having other active base stations, is already established. The BSOI first starts up in subscriber station emulation mode which allows it to operate as a subscriber station in the BWA system (block 82). The BSOI then scans the surrounding environment for interfering base stations in a specified frequency channel and creates a list of interfering base stations (block 84). In a system following the IEEE 802.16 standard, each of the base stations in a BWA system will transmit downlink subframes having preambles that are encoded with a unique code sequence (e.g. OFDM preamble or direct sequence spread spectrum). Thus, the BSOI will be able to detect and distinguish the various interfering base stations in the surrounding environment even though they are all transmitting substantially simultaneously on the same frequency channel. Adaptive antenna system (AAS) techniques may also be employed to avoid interference between base stations and to establish connections with other base stations. The BSOI may also collect other information on the interfering base stations that may be used in selecting a master base station for the BSOI (block 86). The collected information may include, for example, identifiers (IDs) for the detected interfering base stations, received signal level measurements for the interfering base stations, time/frequency/phase offset and propagation delay measurements for the interfering base stations, and/or other information. After (or while) the information has been (is being) collected, the BSOI may begin to send the information to network control functionality (e.g., BSC 26 of FIG. 1) along with a request for the assignment of a master base station (block 88). The network control functionality may then analyze the information and select a master base station for the BSOI. The information may be delivered to the network control functionality via a wired or wireless link (e.g., IP network 24 of FIG. 1, etc.).

Figure 6:
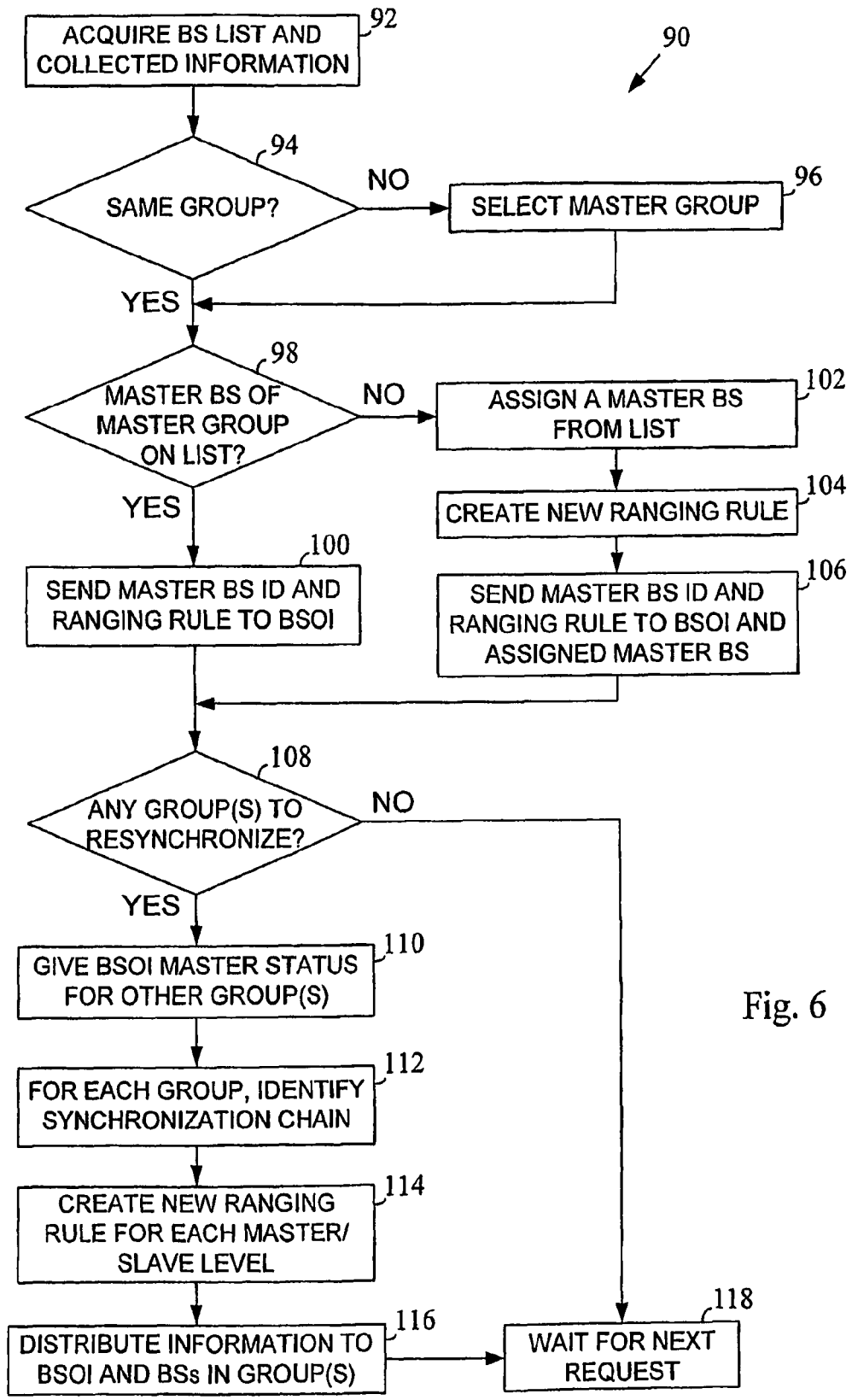
FIG. 6 is a flowchart illustrating an example method for use by network control functionality in a BWA system when a BSOI requests the assignment of a master base station for synchronization purposes in accordance with an embodiment of the present invention.

FIG. 6 is a flowchart illustrating an example method 90 for use by network control functionality in a BWA system when a BSOI requests the assignment of a master base station for synchronization purposes in accordance with an embodiment of the present invention. An interfering base station list and corresponding collected information, along with a master base station assignment request, may first be received from the BSOI, as described previously (block 92). It is next determined whether all of the base stations in the list are within the same sync group (block 94). As described previously, a sync group is a group of base stations that are already synchronized to one another. If the listed base stations are not all members of the same sync group, a master group may be selected from the various groups represented on the list (block 96). A predetermined selection criterion may be used to select the master group from the various groups represented (e.g., select the group having the most members, etc.). If the listed base stations are all members of the same sync group, than this sync group automatically becomes the master sync group (block 94-Yes).

It may next be determined whether there is at least one master base station in the master sync group that is also present on the list of interfering base stations and that has a receive signal level that is adequate to perform accurate synchronization (block 98). If so, then one of these master base stations may be selected as the master base station of the BSOI (block 98-Yes). The ID of this master base station is then delivered to the BSOI along with a "ranging rule" of the master base station (block 100). The ranging rule of the master base station indicates when the master will transmit a ranging code to the BSOI for use during synchronization maintenance mode to correct the synchronization between the BSOI and the master. As will be described in greater detail, each level of a multi-level synchronization hierarchy in a sync group may utilize a different ranging rule from the other levels.

If multiple master base stations in the master sync group are present in the interfering base station list and have adequate receive signal level in block 98, then some predetermined criterion may be used to select one of the master base stations to act as the master base station of the BSOI. For example, in one approach, the master base station having the highest hierarchical level in the master sync group will be selected to be the master base station of the BSOI. Using this approach, for example, the primary master base station in the master group would be selected before a lower level base station. In another selection approach, the master base station having the highest received signal level may be selected, regardless of hierarchical level. A combination of hierarchical level and signal level may also be used. For example, if multiple master base stations are present on a particular hierarchical level, and this level is the highest level that includes a master base station that is also on the list, then the master base station having the highest received signal level may be selected. Other selection criteria may alternatively be used.

If a master base station of the master sync group having an adequate receive signal level to perform accurate synchronization is not present on the list (block 98-No), then another base station from the master sync group may be selected from the list for use as the master base station of the BSOI (block 102). A selection criterion may be specified for selecting the base station to serve as the master base station of the BSOI (e.g., highest hierarchical level, highest receive signal strength, etc.). A new ranging rule is then created for the new master base station (block 104). The ID of the selected master base station and the new ranging rule are then delivered to the BSOI and the new master (block 106). The new master may then prepare itself to transmit a ranging code at a time dictated by the ranging rule.

It may next be determined whether any groups in the BWA system need to be resynchronized (block 108). If multiple sync groups are represented on the interfering base station list, and one of the groups was selected as the master group as described above, then the base stations in the other groups will need to be resynchronized (block 108-Yes). In such a case, the BSOI may be selected as the master base station of the base stations in the other groups (block 110). For each of the other groups, a synchronization chain is developed from the BSOI (block 112). In addition, a new ranging rule may be developed for each new master/slave level in the synchronization hierarchy (block 114). After this is performed, the corresponding information (i.e., master base station assignments and ranging rules) may be delivered to the appropriate base stations in the BWA system (block 116). The method 90 then waits for a next master base station assignment request (block 118). In block 108, if there are no sync groups to be resynchronized (block 108-No), then the method 90 may proceed directly to block 118.

Reference back to FIG. 1 is now made to illustrate the operation of the method 90 of FIG. 6. Assume that base station 16 is to be activate in the system 10. Before base station 16 is activated, assume there are two sync groups: sync group 1 having base stations 12 and 14 and sync group 2 having base stations 18, 20, and 22. Base station 16 collects information on interfering base stations 12, 14, and 18 and sends the information, along with a request for a master base station, to BSC 26. BSC 26 determines that the listed base stations are not all in the same group. BSC 26 may then select sync group 2, for example, as the master group. Assume base station 18 is the sole master base station in sync group 2 and that the received signal strength of the base station 18 is enough to perform accurate synchronization. Because base station 18 is on the list of interfering base stations, it is selected as the master base station of base station 16 (i.e., the BSOI). The assigned master base station ID and corresponding ranging rule are then delivered to base station 16.

Because two sync groups were involved and one was selected as the master group, the base stations in the other group (i.e., sync group 1) need to be resynchronized. Base station 16 is assigned as a master base station over the base stations in sync group 1. Because both base station in sync group 1 (i.e., base station 12 and 14) are on the list of interfering base stations for base station 16, they can both become direct slaves of base station 16. A new ranging rule is then created for the new master/slave level. The assigned master base station ID and new ranging rule are then delivered to base stations 12 and 14.

Figure 7:
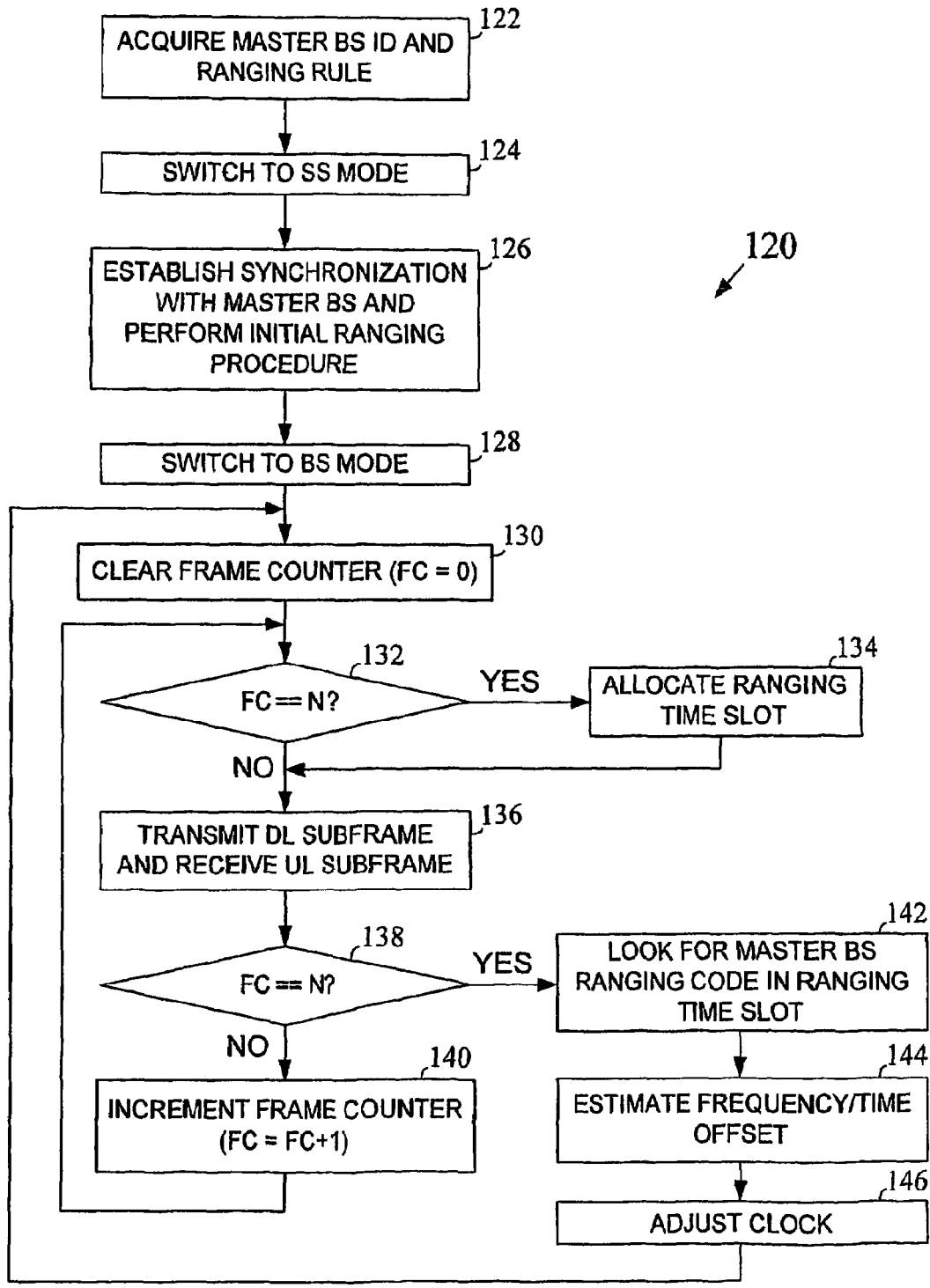
FIG. 7 is a flowchart illustrating an example method for use by a BSOI to initially synchronize to a master base station and to periodically correct this synchronization in accordance with an embodiment of the present invention.

FIG. 7 is a flowchart illustrating an example method 120 for use by a BSOI to initially synchronize to a master base station and to periodically correct this synchronization in accordance with an embodiment of the present invention. The BSOI may first receive the ID of an assigned master base station and the corresponding ranging rule (block 122). The BSOI may then switch to a subscriber station emulation mode if it is not already in such a mode (block 124). While in subscriber station emulation mode, the BSOI may establish synchronization with the master base station and perform an initial ranging procedure (block 126). This may be done in a manner normally used by subscriber stations in the BWA system to synchronize to an associated base station (e.g., the manner outlined in the IEEE 802.16 standard, etc.). After initial synchronization, the BSOI may switch back to base station mode (block 128).

The ranging rule to be followed by the BSOI will typically specify the frame number in which the assigned master base station will transmit a ranging code, as well as the position of the time slot within that frame within which the ranging code will be transmitted. As described in greater detail below, in at least one embodiment of the invention, the BSOI will track this ranging rule and allocate a ranging time slot within which to receive the corresponding ranging code at periodic intervals. As shown in FIG. 7, the BSOI may first clear a frame counter that will keep track of the current frame being processed (block 130). The current value of the frame counter may then be checked to determine whether the appropriate frame number (N) has been reached for the ranging rule (block 132). If the frame number has not been reached (block 132-No), the BSOI may then immediately transmit its downlink subframe and receive its uplink subframe for the current frame (block 136). If the frame number has been reached (block 132-Yes), the BSOI will first allocate a ranging time slot in the current frame within which the ranging code may be received (block 134) before proceeding to block 136.

If the frame number specified by the ranging rule has been reached by the frame counter (block 138-Yes), the BSOI will now look for the master base station ranging code within the allocated ranging time slot (block 142). When detected, the ranging code may be used to estimate frequency and time offsets for the BSOI (block 144). The frequency and time offsets may then be used to adjust a clock of the BSOI to synchronize the BSOI with the master base station (block 146). The method 120 may then proceed back to block 130 where the frame counter is once again cleared. If the frame number specified by the ranging rule has not been reached by the frame counter (block 138-No), the frame counter will be incremented by 1 (block 140) and the method 120 will return to block 132 (i.e., no ranging code will be received during the current frame). The process will then repeat until the frame counter reaches the appropriate frame number. In this manner, the synchronization of the BSOI to the master base station may be periodically corrected or refreshed.

Figure 8:
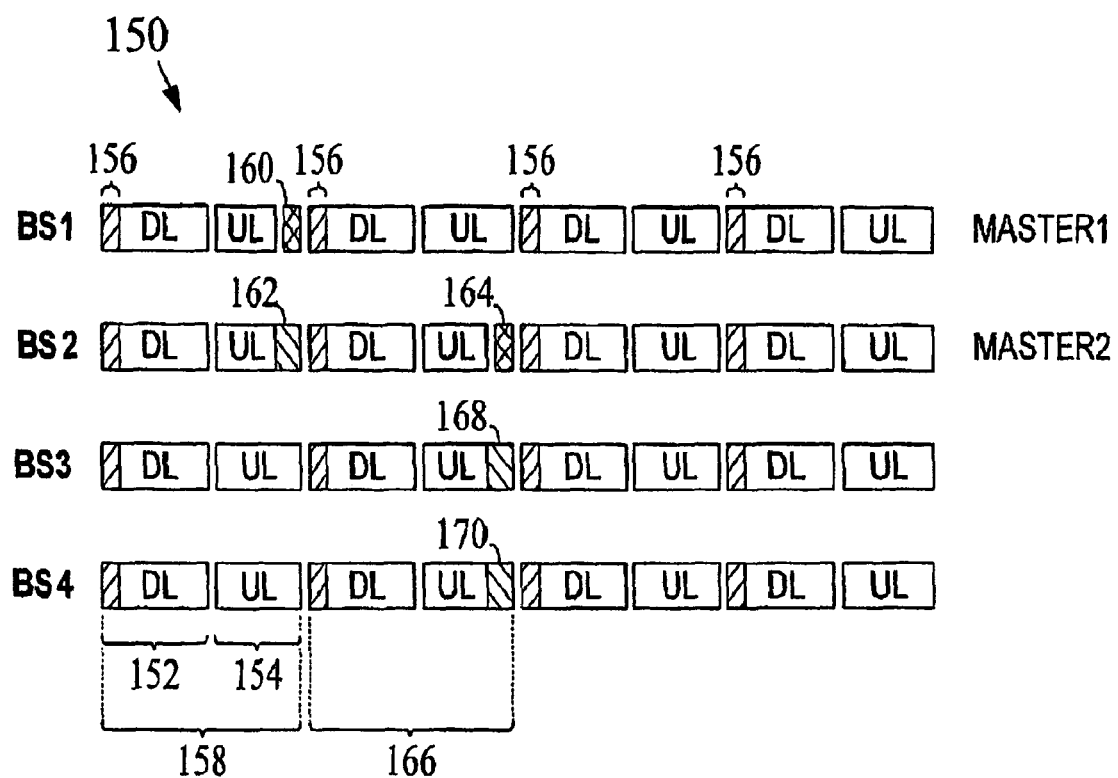
FIG. 8 is a timing diagram illustrating example communication activity within a sync group of a BWA system in accordance with an embodiment of the present invention.

FIG. 8 is a timing diagram illustrating example communication activity 150 within a sync group of BWA system in accordance with an embodiment of the present invention. As shown, the sync group includes four base stations (BS1, BS2, BS3, BS4) that each communicate with corresponding subscriber stations using frames in a common frequency channel. Each of the frames is divided into a downlink subframe 152 and an uplink subframe 154. At the beginning of each downlink subframe 152, the corresponding base station transmits a preamble 156 that may be used by associated subscriber stations to synchronize to the base station. The communication activity 150 represents a multi-level master/slave hierarchy. That is, BS1 acts as a master to slave BS2 within a first level of the hierarchy and BS2 acts as a master to slaves BS3 and BS4 within a second level of the hierarchy. The ranging rule for the first level of the hierarchy indicates that a ranging code 160 may be transmitted by the master (BS1) in frame 1 (158) of the frame sequence, in the last time slot of the frame. Thus, slave BS2 allocates a ranging time slot 162 within which to receive the ranging code 160. Likewise, the ranging rule for the second level of the hierarchy indicates that a ranging code 164 may be transmitted by the master (BS2) in frame 2 (166) of the frame sequence, in the last time slot of the frame. Thus, slaves BS3 and BS4 allocate ranging time slots 168 and 170 within which to receive the ranging code 164. The slave base stations BS2, BS3, BS4 may use the received ranging codes to estimate frequency and time offsets for use in refreshing synchronization to corresponding master base stations. Although not shown in FIG. 8, the frame sequences (i.e., frame 1, frame 2, etc.) will eventually repeat in time for each base station.

Figure 9:
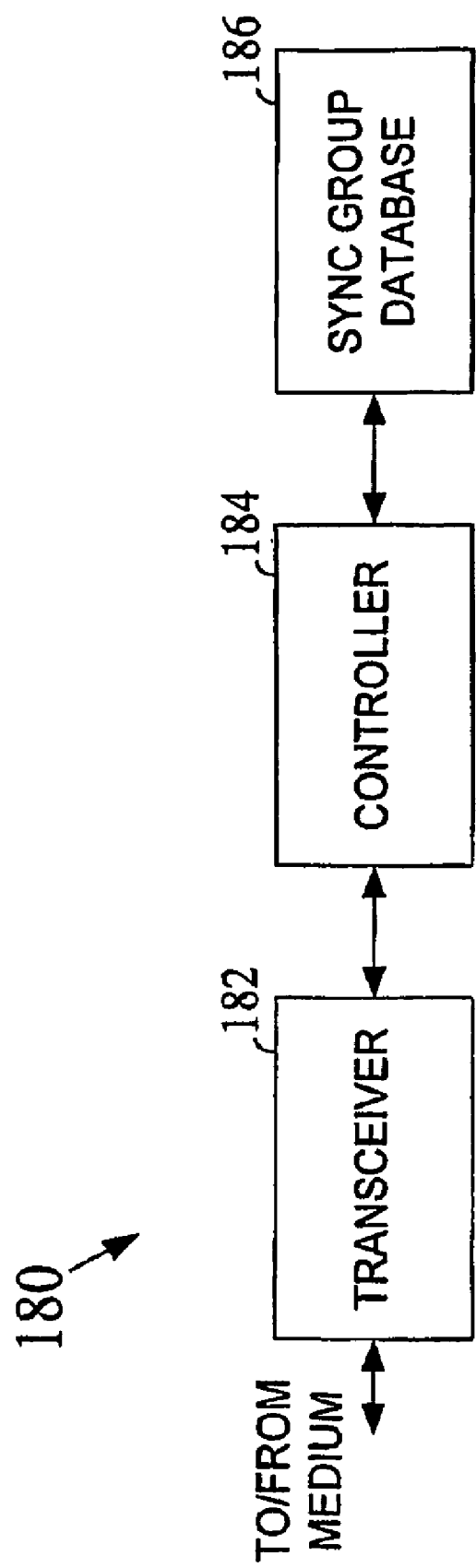
FIG. 9 is a block diagram illustrating an example BSC architecture 180 in accordance with an embodiment of the present invention.

FIG. 9 is a block diagram illustrating an example BSC architecture 180 in accordance with an embodiment of the present invention. The BSC 180 may be used, for example, within the BWA system 10 of FIG. 1 or in other BWA systems. As shown, the BSC 180 may include: a transceiver 182, a controller 184, and a sync group database 186. The transceiver 182 is operative for receiving signals from and sending signals to base stations in the BWA system. A receiver portion of the transceiver 182 may receive, for example, a list of interfering base stations and related information as well as a request for assignment of a master base station from a BSOI. When a master base station assignment has been made for the BSOI, a transmitter portion of the transceiver 182 may transmit the assignment information to the BSOI.

The controller 184 may make the actual master base station assignment decisions. In at least one embodiment, the controller 184 may be configured during system operation to perform the method of FIG. 6 or variations thereof. The controller 184 may be implemented within one or more digital processing devices within BSC 180. The digital processing device(s) may include, for example, a general purpose microprocessor, a digital signal processor (ASP), a reduced instruction set computer (RISC), a complex instruction set computer (CISC), a field programmable gate array (FPGA), an application specific integrated circuit (ASIC), and/or others, including combinations of the above.

The sync group database 186 may be used by the controller 184 to store information about the sync groups that are currently present within the BWA system. This may include information on the members of each sync group, the synchronization hierarchies of each sync group, the ranging rules used at each master/slave level of a sync group, signal strength of interfering base stations at the location of each base station, propagation loss between base stations, and/or other sync group related information. The controller 184 may consult the sync group database 186 during the master base station assignment process for a BSOI. After a decision has been made by the controller 184, appropriate modification may be made to the sync group database 186 to reflect the decision. Any resynchronizations performed by the controller 184 will also be recorded within the sync group database 186.

In at least one embodiment of the present invention, low-cost base stations are provided for use in a BWA system that do not include GPS receivers. That is, features of the invention are utilized to provide synchronization between base stations within the system, thus eliminating the need for GPS receivers in the base stations. In some other embodiments, the inventive features are made available in addition to GPS receiver technology within a base station to provide an alternative synchronization means for use in, for example, indoor environments and in other scenarios where an adequate number of GPS satellites may not be acquired.

In the foregoing description, terminology has been used that is often associated with the IEEE 802.16 wireless networking standard. It should be appreciated, however, that the invention is not limited to use within IEEE 802.16 related systems. That is, the base station synchronization techniques described herein may have application in a wide range of different cellular based wireless systems. In addition, the inventive principles are not limited to use within systems utilizing OFDM or OFDMA communication techniques.

The techniques and structures of the present invention may be implemented in any of a variety of different forms. For example, features of the invention may be embodied within laptop, palmtop, desktop, and tablet computers having wireless capability; wireless base stations; wireless access points; base station controllers; network interface cards (NICs) and other network interface structures; integrated circuits; as instructions and/or data structures stored on machine readable media, and/or in other formats. Examples of different types of machine readable media that may be used include floppy diskettes, hard disks, optical disks, compact disc read only memories (CD-ROMs), digital video disks (DVD), Blu-ray disks, magneto-optical disks, read only memories (ROMs), random access memories (RAMs), erasable programmable ROMs (EPROMs), electrically erasable programmable ROMs (EPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
acquiring information about interfering base stations in a vicinity of a base station of interest (BSOI); and
choosing one of said interfering base stations as a master base station for said BSOI, wherein a master base station is a base station to which another base station is to synchronize;
wherein choosing one of said interfering base stations as a master base station includes:
when said interfering base stations are from multiple sync groups, selecting a sync group from said multiple sync groups to be a master sync group, wherein a sync group is a group of base stations that are currently synchronized with one another;
when said interfering base stations are all from a common sync group, identifying said common sync group as said master sync group; and
when said master sync group includes at least one master base station that is also one of said interfering base stations and that has a received signal strength within said BSOI that is adequate to perform accurate synchronization, assigning one of said at least one master base station as a master base station of said BSOI.

2. The method of claim 1, further comprising:
delivering an ID of said assigned master base station and a corresponding ranging rule to said BSOI.

3. The method of claim 1, wherein choosing one of said interfering base stations as a master base station further includes:
when said master sync group does not include a master base station that is also one of said interfering base stations and that has a received signal strength within said BSOI that is adequate to perform accurate synchronization, selecting a base station from said master sync group that is one of said interfering base stations as the master base station of said BSOI; and
creating a new ranging rule for said selected master base station.

4. The method of claim 3, further comprising:
delivering an ID of said selected master base station and said new ranging rule to said BSOI and said selected master base station.

5. The method of claim 1, further comprising:
when said interfering base stations are from multiple sync groups and one of said multiple sync groups has been selected as said master sync group, giving said BSOI master status over sync groups in said multiple sync groups other than said master sync group.

6. The method of claim 5, further comprising:
identifying synchronization chains for said sync groups in said multiple sync groups other than said master sync group, wherein each synchronization chain originates at said BSOI; and
creating a new ranging rule for each master/slave level within each synchronization chain.

7. The method of claim 1, wherein:
acquiring information includes receiving said information from said BSOI, wherein said information is accompanied by a request to assign a master base station to said BSOI.

8. A base station controller (BSC) comprising:
a receiver to receive a list of interfering base stations associated with a base station of interest (BSOI);
a controller to select a master base station for said BSOI from said list of interfering base stations, wherein a master base station is a base station to which another base station is to synchronize; and
a sync group database to store data related to base station sync groups in an associated wireless network, each sync group including one or more base stations in said wireless network that are currently synchronized to one another, wherein said controller is in communication with said sync group database;
wherein said controller is to: (a) when said base stations in said list of interfering base stations are from multiple sync groups, select a master sync group from said multiple sync groups; (b) when said base stations in said list of interfering base stations are from a common sync group, identify said common sync group as said master sync group; and (c) select a base station from said list of interfering base stations, that is within said master sync group, for use as a master base station for said BSOI.

9. The BSC of claim 8, wherein:
operation to select a base station from said list includes operation to:
when said master sync group includes at least one master base station that is also one of said interfering base stations and that has a received signal strength in said BSOI that is adequate to perform accurate synchronization, assign one of said at least one master base stations as a master base station of said BSOI.

10. The BSC of claim 9, wherein:
operation to select a base station from said list includes operation to:
when said master sync group does not include a master base station that is also one of said interfering base stations and that has a receive signal strength within said BSOI that is adequate to perform accurate synchronization, select a base station from said master sync group that is one of said interfering base stations as the master base station of said BSOI.

11. The BSC of claim 10, wherein:
operation to select a base station from said list includes operation to:
when said master sync group does not include a master base station that is also one of said interfering base stations, create a new ranging rule for said selected master base station.

12. The BSC of claim 8, wherein said controller is configured to:
when said base stations in said list of interfering base stations are from multiple sync groups and one of said sync groups has been selected as a master sync group:
give said BSOI master base station status over sync groups in said multiple sync groups other than said master sync group;
identify synchronization chains for said sync groups in said multiple sync groups other than said master sync group, wherein each synchronization chain originates at said BSOI; and
create a new ranging rule for each master/slave level within each synchronization chain.

13. The BSC of claim 8, further comprising:
a transmitter to transmit a master base station ID and a corresponding ranging rule to said BSOI.

14. An article comprising a machine readable storage medium having instructions stored thereon that, when executed by a computing platform, operate to:
acquire information about interfering base stations in a vicinity of a base station of interest (BSOI); and
choose one of said interfering base stations as a master base station for said BSOI, wherein a master base station is a base station to which another base station is to synchronize;
wherein operation to choose one of said interfering base stations as a master base station includes operation to:
when said interfering base stations are from multiple sync groups, select a sync group from said multiple sync groups to be a master sync group, wherein a sync group is a group of base stations that are currently synchronized with one another;
when said interfering base stations are all from a common sync group, identify said common sync group as said master sync group; and
when said master sync group includes at least one master base station that is also one of said interfering base stations and that has a received signal strength within said BSOI that is adequate to perform accurate synchronization, assign one of said at least one master base stations as a master base station of said BSOI.

15. The article of claim 14, wherein:
operation to choose one of said interfering base stations as a master base station further includes operation to:
when said master sync group does not include a master base station that is also one of said interfering base stations and that has a received signal strength within said BSOI that is adequate to perform accurate synchronization, select a base station from said master sync group that is one of said interfering base stations as the master base station of said BSOI; and
create a new ranging rule for said selected master base station.

16. The article of claim 14, wherein:
operation to choose one of said interfering base stations as a master base station further includes operation to:
when said master sync group does not include a master base station that is also one of said interfering base stations and that has a received signal strength within said BSOI that is adequate to perform accurate synchronization, select a base station from said master sync group that is one of said interfering base stations as the master base station of said BSOI; and
create a new ranging rule for said selected master base station.

17. The article of claim 16, wherein said instructions further operate to:
deliver an ID of said selected master base station and said new ranging rule to said BSOI and said selected master base station.

18. The article of claim 14, wherein said instructions further operate to:
when said interfering base stations are from multiple sync groups and one of said multiple sync groups has been selected as said master sync group, give said BSOI master status over sync groups in said multiple sync groups other than said master sync group.

19. The article of claim 18, wherein said instructions further operate to:

identify synchronization chains for said sync groups in said multiple sync groups other than said master sync group, wherein each synchronization chain originates at said BSOI; and create a new ranging rule for each master/slave level within each synchronization chain.

* * * * *